US011159848B2

(12) United States Patent
Ju et al.

(10) Patent No.: US 11,159,848 B2
(45) Date of Patent: Oct. 26, 2021

(54) VIDEO PLAYING METHOD, DEVICE, AND SYSTEM

(71) Applicant: Huawei Technologies Co., Ltd., Shenzhen (CN)

(72) Inventors: Ran Ju, Nanjing (CN); Jin Li, Nanjing (CN); Feng Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 16/664,093

(22) Filed: Oct. 25, 2019

(65) Prior Publication Data

US 2020/0059694 A1 Feb. 20, 2020

Related U.S. Application Data

(63) Continuation of application No. PCT/CN2018/084496, filed on Apr. 25, 2018.

(30) Foreign Application Priority Data

Apr. 28, 2017 (CN) ........................ 201710294033.5

(51) Int. Cl.
*H04N 21/4402* (2011.01)
*H04N 13/167* (2018.01)
(Continued)

(52) U.S. Cl.
CPC ... *H04N 21/440263* (2013.01); *H04N 13/156* (2018.05); *H04N 13/167* (2018.05);
(Continued)

(58) Field of Classification Search
CPC ....... H04N 21/440263; H04N 21/4621; H04N 19/597; H04N 21/816; H04N 13/00;
(Continued)

(56) References Cited

U.S. PATENT DOCUMENTS 6,222,675 B1 4/2001 Mall et al.
6,611,268 B1 8/2003 Szeliski et al.
(Continued)

FOREIGN PATENT DOCUMENTS

CN 103534727 A 1/2014
CN 103548357 A 1/2014
(Continued)

OTHER PUBLICATIONS

Huawei Technologies Co., Ltd., "Whitepaper on the VR-Oriented Bearer Network Requirement (2016)," Sep. 15, 2016, 54 pages.
(Continued)

*Primary Examiner* — Omar S Parra
(74) *Attorney, Agent, or Firm* — Slater Matsil, LLP

(57) ABSTRACT

A video playing method, a device, and a system are provided. The method includes: receiving, by a VR device, a first-resolution VR video stream of a first viewing angle and a second-resolution VR video stream of a full viewing angle that are sent by a server, where the first resolution is greater than the second resolution; playing an image of the first viewing angle by using the VR video stream of the first viewing angle; when determining that the viewing angle changes, playing an image of a current viewing angle by using the first or both of the VR video stream of the full viewing angle and the VR video stream of the first viewing angle; sending, to the server, viewing angle information that carries a parameter for indicating a changed-to second viewing angle; receiving a first-resolution VR video stream of the second viewing angle sent by the server.

8 Claims, 7 Drawing Sheets

(51) Int. Cl.

| | |
|---|---|
| ***H04N 13/156*** | (2018.01) |
| ***H04N 13/194*** | (2018.01) |
| ***H04N 21/414*** | (2011.01) |
| ***H04N 21/433*** | (2011.01) |
| ***H04N 21/434*** | (2011.01) |
| ***H04N 21/44*** | (2011.01) |
| ***H04N 21/462*** | (2011.01) |
| ***H04N 21/81*** | (2011.01) |
| ***H04N 21/8547*** | (2011.01) |

(52) U.S. Cl.
CPC ......... *H04N 13/194* (2018.05); *H04N 21/414* (2013.01); *H04N 21/433* (2013.01); *H04N 21/434* (2013.01); *H04N 21/44004* (2013.01); *H04N 21/4621* (2013.01); *H04N 21/816* (2013.01); *H04N 21/8547* (2013.01)

(58) Field of Classification Search
CPC .. H04N 13/156; H04N 13/167; H04N 13/194; H04N 21/234363; H04N 21/414; H04N 21/432; H04N 21/433; H04N 21/434; H04N 21/4384; H04N 21/44004; H04N 21/4402; H04N 21/4728; H04N 21/8547; H04N 21/2662; H04N 21/4325; H04N 21/462; H04N 21/81; G02B 27/017; G02B 2027/0147; G02B 2027/0187
See application file for complete search history.

(56) References Cited

U.S. PATENT DOCUMENTS

| | | | |
|---|---|---|---|
| 2002/0101612 | A1 | 8/2002 | Lauper et al. |
| 2004/0003409 | A1 | 1/2004 | Berstis |
| 2004/0086186 | A1 | 5/2004 | Kyusojin et al. |
| 2004/0102713 | A1 | 5/2004 | Dunn |
| 2012/0293607 | A1 | 11/2012 | Bhogal et al. |
| 2014/0140415 | A1 | 5/2014 | Choe et al. |
| 2016/0012855 | A1 | 1/2016 | Krishnan |
| 2016/0352791 | A1* | 12/2016 | Adams ................. H04N 21/816 |
| 2016/0353146 | A1 | 12/2016 | Weaver et al. |
| 2017/0294049 | A1 | 10/2017 | Zhou |
| 2018/0160160 | A1* | 6/2018 | Swaminathan .... H04N 21/8456 |
| 2018/0324355 | A1 | 11/2018 | Wang |

FOREIGN PATENT DOCUMENTS

| | | | |
|---|---|---|---|
| CN | 104125501 | A | 10/2014 |
| CN | 105791882 | A | 7/2016 |
| CN | 105916060 | A | 8/2016 |
| CN | 106231317 | A | 12/2016 |
| CN | 109891906 | A | 6/2019 |
| EP | 3065406 | A1 | 9/2016 |
| JP | 2001229397 | A | 8/2001 |
| JP | 2003519982 | A | 6/2003 |
| JP | 2012222399 | A | 11/2012 |
| JP | 2016015705 | A | 1/2016 |
| JP | 2016165105 | A | 9/2016 |
| JP | 2019516297 | A | 6/2019 |
| WO | 2006106371 | A1 | 10/2006 |
| WO | 2017177090 | A1 | 10/2017 |

OTHER PUBLICATIONS

Kuzyakov, E. et al., “Next-generation video encoding techniques for 360 video and VR,” Posted on Jan. 21, 2016 Tto Video Engineering, Virtual Reality, 6 pages.

Dunbar, L. et al., “Directory Assisted TRILL Encapsulation. draft-ietf-trill-directory-assisted-encap-00,” Dec. 16, 2014, 11 pages.

Dunbar, L. et al., “Directory Assisted TRILL Encapsulation. draft-ieff-trill-directory-assisted-encap-01,” Oct. 12, 2015, 11 pages.

Dunbar, L. et al., “Directory Assisted TRILL Encapsulation, draft-ieff-trill-directory-assisted-encap-02,” Feb. 20, 2016, 11 pages.

Dunbar, L. et al., “Directory Assisted TRILL Encapsulation, draft-ieff-trill-directory-assisted-encap-03,” Jul. 8, 2016, 11 pages.

Dunbar, L. et al., “Directory Assisted TRILL Encapsulation, draft-ieff-trill-directory-assisted-encap-04,” Dec. 28, 2016,15 pages.

Sajassi, A. et al., “BGP MPLS-Based Ethernet VPN,” RFC7432, Feb. 2015, 56 pages.

* cited by examiner

VIDEO PLAYING METHOD, DEVICE, AND SYSTEM

CROSS-REFERENCE TO RELATED APPLICATIONS

This application is a continuation of International Application No. PCT/CN2018/084496, filed on Apr. 25, 2018, which claims priority to Chinese Patent Application No. 201710294033.5, filed on Apr. 28, 2017. The disclosures of the aforementioned applications are hereby incorporated by reference in their entireties.

TECHNICAL FIELD

Embodiments of this application relate to the field of virtual reality (virtual reality, VR) technologies, and in particular, to a video playing method, a device, and a system.

BACKGROUND

A VR technology is a computer simulation technology that allows a virtual world to be created and experienced, and the VR technology can provide a user with visual, auditory, tactile, and other sensory immersive experience. A network VR technology is a technology that provides a VR service for a user by using a network. A service server deployed in the network transmits a VR video stream to a VR device by using the network, and the VR device plays the received VR video stream.

Currently, the following two solutions are usually used to transmit and play a VR video stream. In a first solution, the server sends a 360-degree panoramic VR video stream to the VR device, and the VR device uses the 360-degree panoramic VR video stream to play an image corresponding to a viewing angle of the user. A resolution of the 360-degree panoramic VR video stream is relatively high, and a data volume of the 360-degree panoramic VR video stream is relatively large, and therefore relatively large bandwidth needs to be occupied to transmit the 360-degree panoramic VR video stream, and bandwidth used by a common home user cannot meet a transmission requirement of the 360-degree panoramic VR video stream. In a second solution, the server extracts, from a 360-degree panoramic VR video stream, a VR video stream corresponding to a viewing angle of the user; the server transmits, to the VR device, only the VR video stream corresponding to the viewing angle of the user; and the VR device receives and directly plays the VR video stream. The first solution may be referred to as a 360-degree transmission solution, and the second solution may be referred to as a field of view (FOV) transmission solution. Compared with the first solution, the second solution can save bandwidth, but has the following problem: When the viewing angle of the user changes, the VR device needs to request to obtain, from the server, a VR video stream corresponding to a changed-to viewing angle. Because transmission and buffering take a specific time, a motion-to-photon (MTP) latency is relatively high, and an MTP latency requirement of less than 20 milliseconds required by the VR technology cannot be met. The MTP latency is a latency between the change of the viewing angle of the user and displaying, by the VR device, of an image corresponding to the changed-to viewing angle.

Therefore, problems of a high latency and occupation of large bandwidth of a network VR service cannot be resolved together in a current technology.

SUMMARY

Embodiments of this application provide a video playing method, a device, and a system, to overcome a difficulty that problems of a high latency and occupation of large bandwidth of a network VR service cannot be resolved together.

According to an aspect, an embodiment of this application provides a video playing method, where the method includes: receiving, by a VR device, a first-resolution VR video stream of a first viewing angle and a second-resolution VR video stream of a full viewing angle that are sent by a server, where the first resolution is greater than the second resolution; playing, by the VR device, an image of the first viewing angle by using the first-resolution VR video stream of the first viewing angle; when the VR device determines that the viewing angle changes, playing, by the VR device, an image of a current viewing angle by using the first or both of the second-resolution VR video stream of the full viewing angle and the first-resolution VR video stream of the first viewing angle; sending, by the VR device, viewing angle information to the server, where the viewing angle information carries a parameter for indicating a changed-to second viewing angle; sending, by the server, a first-resolution VR video stream of the second viewing angle to the VR device based on the parameter; and playing, by the VR device, an image of the second viewing angle by using the first-resolution VR video stream of the second viewing angle.

According to the solution provided in this embodiment of this application, the server sends two service data streams to the VR device. One is a high-resolution VR video stream of a viewing angle, and is used to meet a display requirement in a case of a fixed viewing angle. The other is a low-resolution VR video stream of the full viewing angle, and is used to meet a display requirement during viewing angle switching. Compared with a 360-degree transmission solution, in this solution, bandwidth occupation is reduced. In addition, the low-resolution VR video stream of the full viewing angle covers 360 degrees of viewing angles, so that image data required during viewing angle switching does not need to be obtained from the server through requesting, thereby reducing a display latency during viewing angle switching.

In a possible design, the playing, by the VR device, an image of a current viewing angle by using the second-resolution VR video stream of the full viewing angle includes: decoding, by the VR device, the second-resolution VR video stream of the full viewing angle, to obtain a full viewing angle image; extracting, by the VR device, the image of the current viewing angle from the full viewing angle image; and playing, by the VR device, the image of the current viewing angle.

According to the solution provided in this embodiment of this application, during a viewing angle change, the VR device reads the second-resolution VR video stream of the full viewing angle from a video buffer, and plays the image of the current viewing angle using the second-resolution VR video stream of the full viewing angle. Because the second-resolution VR video stream of the full viewing angle is stored in the local video buffer, the VR device does not need to request to obtain the VR video stream from the server. Therefore, an MTP latency during viewing angle switching can be reduced, and an MTP latency requirement of less than 20 milliseconds is met. In addition, during the viewing angle change (for example, in a process in which a user turns the head), a low-resolution image is displayed; however, an image sensed by a human eye during movement is blurry, so that displaying the low-resolution image to the user does not degrade visual experience.

In a possible design, the playing, by the VR device, an image of a current viewing angle by using the second-resolution VR video stream of the full viewing angle and the first-resolution VR video stream of the first viewing angle includes: decoding, by the VR device, the first-resolution VR video stream of the first viewing angle, to obtain the image of the first viewing angle; decoding, by the VR device, the second-resolution VR video stream of the full viewing angle, to obtain a full viewing angle image; extracting, by the VR device, an overlapping image from the image of the first viewing angle, and extracting a non-overlapping image from the full viewing angle image, where the overlapping image is an image of an overlapping area between the image of the first viewing angle and the image of the current viewing angle, and the non-overlapping image is an image different from the image of the overlapping area in the image of the current viewing angle; combining, by the VR device, the overlapping image and the non-overlapping image to obtain the image of the current viewing angle; and playing, by the VR device, the image of the current viewing angle.

According to the solution provided in this embodiment of this application, during the viewing angle change, there may still be an overlapping area between the current viewing angle and the first viewing angle. An image of the overlapping area may still be played by using a high resolution, to reduce a definition loss as much as possible.

In a possible design, after the receiving, by the VR device, a first-resolution VR video stream of the second viewing angle sent by the server, the method further includes: detecting, by the VR device, whether a time stamp of the received first-resolution VR video stream of the second viewing angle is synchronized with a time stamp of the currently played image, where "synchronized" means that the time stamp of the received first-resolution VR video stream of the second viewing angle includes the time stamp of the currently played image; and if the time stamp of the received first-resolution VR video stream of the second viewing angle is synchronized with the time stamp of the currently played image, performing, by the VR device, the step of playing an image of the second viewing angle by using the first-resolution VR video stream of the second viewing angle; or if the time stamp of the received first-resolution VR video stream of the second viewing angle is not synchronized with the time stamp of the currently played image, playing, by the VR device, the image of the second viewing angle by using the first or both of the second-resolution VR video stream of the full viewing angle and the first-resolution VR video stream of the first viewing angle.

According to the solution provided in this embodiment of this application, the VR device further detects whether the time stamp of the received first-resolution VR video stream of the second viewing angle is synchronized with the time stamp of the currently played image, to ensure smooth and accurate VR video playing for the user.

In a possible design, after the receiving, by a VR device, a first-resolution VR video stream of a first viewing angle and a second-resolution VR video stream of a full viewing angle that are sent by a server, the method further includes: storing, by the VR device, the first-resolution VR video stream of the first viewing angle to a first video buffer, and storing the second-resolution VR video stream of the full viewing angle to a second video buffer.

According to the solution provided in this embodiment of this application, the VR device separately stores VR video streams at different resolutions by using two video buffers, facilitating quick selection of different VR video streams for playing, and improving switching smoothness.

In a possible design, the method further includes: when the VR device determines that the viewing angle changes, or when the VR device plays the image of the second viewing angle by using the first-resolution VR video stream of the second viewing angle, performing, by the VR device, data aging on the first-resolution VR video stream of the first viewing angle buffered in the first video buffer.

According to the solution provided in this embodiment of this application, when the VR device does not need to use the first-resolution VR video stream of the first viewing angle buffered in the first video buffer, the VR device performs data aging on the data. This can release buffering resources in the first video buffer as soon as possible.

In a possible design, the playing, by the VR device, an image of the first viewing angle by using the first-resolution VR video stream of the first viewing angle includes: decoding, by the VR device, the first-resolution VR video stream of the first viewing angle, to obtain the image of the first viewing angle; and playing, by the VR device, the image of the first viewing angle; and the playing, by the VR device, an image of the second viewing angle by using the first-resolution VR video stream of the second viewing angle includes: decoding, by the VR device, the first-resolution VR video stream of the second viewing angle, to obtain the image of the second viewing angle; and playing, by the VR device, the image of the second viewing angle.

According to the technical solution provided in this embodiment of this application, because the VR device separately decodes different VR video streams, the different VR video streams can be distinguished from each other.

According to another aspect, an embodiment of this application provides a VR device. The VR device has a function of implementing operations on a VR device side in the foregoing method example. The function may be implemented by using hardware, or may be implemented by executing corresponding software by hardware. The hardware or software includes one or more modules or units corresponding to the foregoing function.

In a possible design, a structure of the VR device includes a processor and a communications interface. The processor is configured to support the VR device in performing a corresponding function in the foregoing method. The communications interface is configured to support communication between the VR device and another device. Further, the VR device may further include a memory. The memory is configured to couple with the processor, and stores a program instruction and data that are necessary for the VR device.

According to still another aspect, an embodiment of this application provides a server. The server has a function of implementing operations on a server side in the foregoing method example. The function may be implemented by using hardware, or may be implemented by executing corresponding software by hardware. The hardware or software includes one or more modules or units corresponding to the foregoing function.

In a possible design, a structure of the server includes a processor and a communications interface. The processor is configured to support the server in performing a corresponding function in the foregoing method. The communications interface is configured to support communication between the server and another device. Further, the server may further include a memory. The memory is configured to couple with the processor, and stores a program instruction and data that are necessary for the server.

According to yet another aspect, an embodiment of this application provides a video playing system. The system includes the VR device and the server that are described in the foregoing aspects.

According to still yet another aspect, an embodiment of this application provides a computer storage medium, configured to store a computer software instruction for use by the foregoing VR device, where the computer software instruction includes a program designed for executing the foregoing aspects.

According to a further aspect, an embodiment of this application provides a computer storage medium, configured to store a computer software instruction for use by the foregoing server, where the computer software instruction includes a program designed for executing the foregoing aspects.

According to a still further aspect, an embodiment of this application provides a computer program product. When the computer program product is executed, the computer program product is configured to execute the method on a VR device side according to the foregoing aspect.

According to a yet further aspect, an embodiment of this application provides a computer program product. When the computer program product is executed, the computer program product is configured to execute the method on a server side according to the foregoing aspect.

Compared with the prior art, according to the solutions provided in the embodiments of this application, the server sends two service data streams to the VR device. One is a high-resolution VR video stream of a viewing angle, and is used to meet a display requirement in a case of a fixed viewing angle. The other is a low-resolution VR video stream of the full viewing angle, and is used to meet a display requirement during viewing angle switching. Compared with a 360-degree transmission solution, in the solutions, bandwidth occupation is reduced. In addition, the low-resolution VR video stream of the full viewing angle covers 360 degrees of viewing angles, so that image data required during viewing angle switching does not need to be obtained from the server through requesting, thereby reducing a display latency during viewing angle switching.

DETAILED DESCRIPTION OF ILLUSTRATIVE EMBODIMENTS

To make the objectives, technical solutions, and advantages of this application clearer, the following describes the technical solutions in the embodiments of this application with reference to the accompanying drawings.

A system architecture and a service scenario that are described in the embodiments of this application are intended to describe the technical solutions provided in the embodiments of this application more clearly, and do not constitute limitations to the technical solutions in the embodiments of this application. A person of ordinary skill in the art may know that with evolution of the system architecture and emergence of a new service scenario, the technical solutions provided in the embodiments of this application are also applicable to a similar technical problem.

Figure 2A:
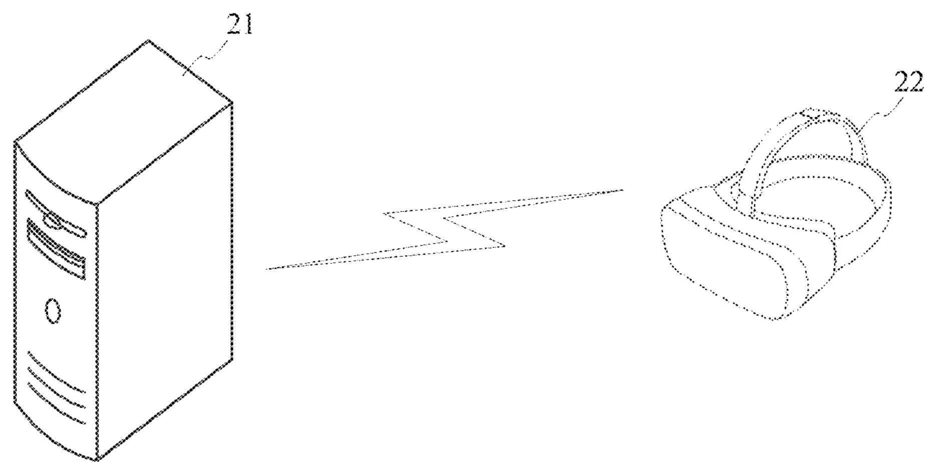
FIG. 2A is a schematic diagram of an application scenario according to an embodiment of this application.

FIG. 2A is a schematic diagram of a possible application scenario according to an embodiment of this application. The application scenario may be a network VR system, and the network VR system is a system that provides a VR service for a user by using a network. The application scenario may include a VR device 21 and a server 22.

The VR device 21 is configured to: receive a VR video stream sent by the server 22, and play an image based on the VR video stream, to provide the user with a function of viewing a VR video. The VR device 21 may be a head-mounted VR display device such as a VR helmet or VR glasses. Certainly, the VR device may alternatively be any other device that can be used to play a VR video.

The server 22 stores a VR video resource, and is configured to provide a VR video stream for the VR device 21. The server 22 may be a server, a server cluster including a plurality of servers, or a cloud computing service center. Optionally, the server 22 is a background server configured to provide a network VR service, such as a background server configured to provide a network VR service website or application.

There is a communication connection between the VR device 21 and the server 22. The communication connection may be a wireless network connection, or may be a wired network connection.

Figure 2B:
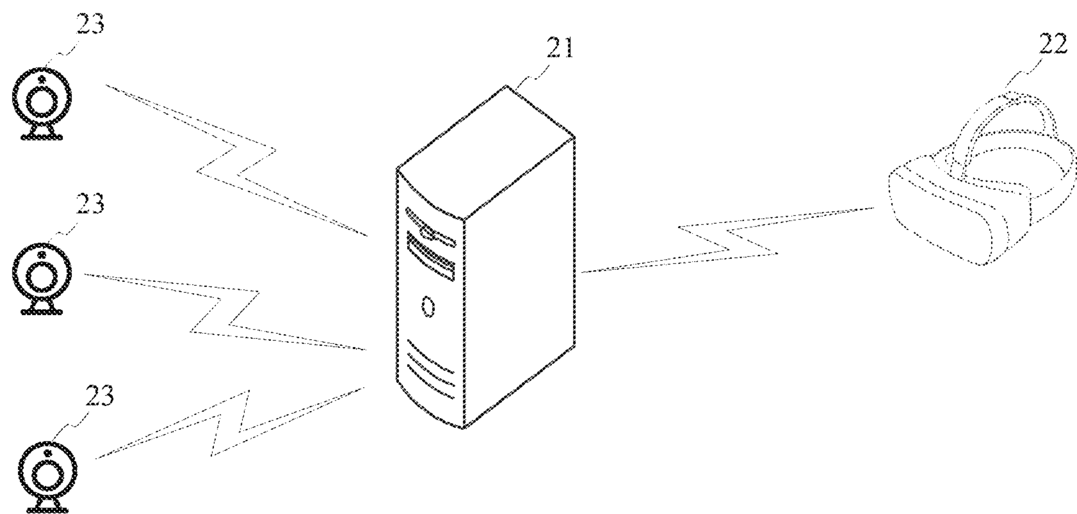
FIG. 2B is a schematic diagram of an application scenario according to another embodiment of this application.

Based on the application scenario provided in the embodiment of FIG. 2A, with reference to FIG. 2B, an embodiment of this application further provides a schematic diagram of another possible application scenario. The application scenario includes not only the VR device 21 and the server 22 but also at least one camera 23.

The camera 23 is configured to: collect a VR video stream, and send the collected VR video stream to the server 22.

There is a communication connection between the camera 23 and the server 22. The communication connection may be a wireless network connection, or may be a wired network connection.

The application scenario provided in the embodiment of FIG. 2B is applicable to a live broadcast scenario.

Figure 1A:
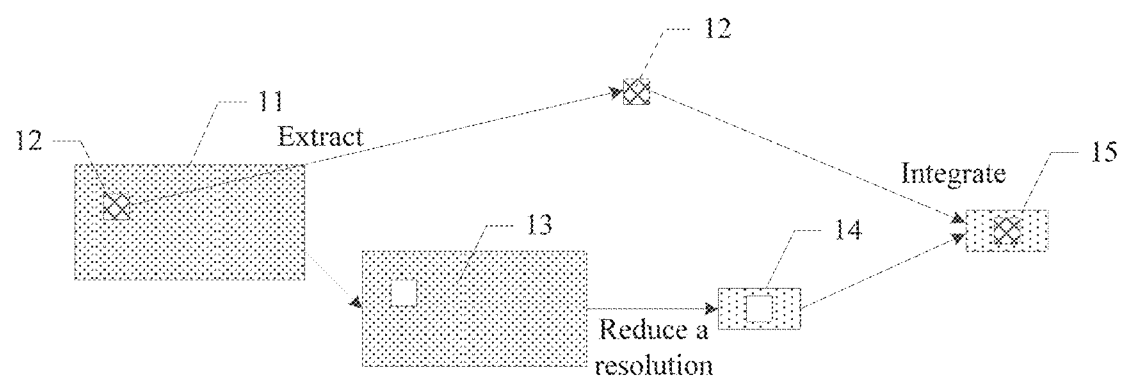
FIG. 1A is a schematic diagram of generating a VR image of a single viewing angle according to an example.
Figure 1B:
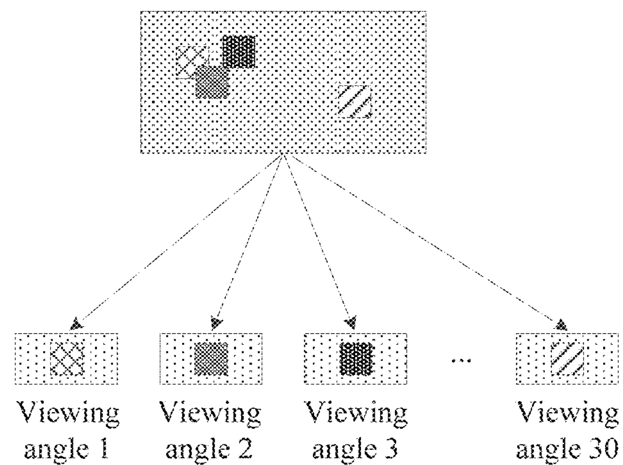
FIG. 1B is a schematic diagram of generating VR images of a plurality of viewing angles according to an example.

In an example, a method for transmitting and playing a VR video is provided. The server divides a 360-degree viewing angle into 30 viewing angles in advance, and a process of generating a VR image of each viewing angle is shown in FIG. 1A. A target viewing angle is used as an example, and the target viewing angle is any one of the foregoing 30 viewing angles. The server extracts an image 12 of a target viewing angle area from a 360-degree panoramic image 11, and an image that remains after the image 12 of the target viewing angle area is removed from the 360-degree panoramic image 11 may be referred to as a background area image 13. The server reduces a resolution of the background area image 13, and obtains a low-resolution background area image 14. A VR image 15 of the target viewing angle includes the image 12 of the target viewing angle area and the low-resolution background area image 14. In this way, VR images of the 30 viewing angles may be shown in FIG. 1B.

In an example, assuming that a current viewing angle of the user is a viewing angle 2, the VR device receives a VR video stream of the viewing angle 2 from the server and stores the VR video stream to a video buffer, and the VR device plays an image of the viewing angle 2 by using the VR video stream of the viewing angle 2. When the user switches from the viewing angle 2 to a viewing angle 3, the VR device requests to obtain a VR video stream of the viewing angle 3 from the server. Both network transmission and video buffering need to take a specific time, and therefore before the VR video stream of the viewing angle 3 arrives at the VR device and is available for playing, the VR device first extracts an image of a current viewing angle from a low-resolution background area image of the locally buffered VR video stream of the viewing angle 2 and plays the image. During viewing angle switching, a low-resolution image is displayed; however, an image sensed by a human eye during movement is blurry, so that displaying the low-resolution image during viewing angle switching does not degrade visual experience obviously.

The solution provided in the foregoing example resolves problems of a high latency and occupation of large bandwidth of the network VR service, but has the following technical problems:

First, storage overheads on a server side are large. The server needs to pre-store VR video streams of the 30 viewing angles, and a VR video stream of each viewing angle includes a low-resolution background area image. The low-resolution background area images have a large amount of overlapping content, leading to an increase of the storage overheads on the server side.

Second, a traffic burst occurs during viewing angle switching. During viewing angle switching, operations from requesting, by the VR device, to obtain a VR video stream of a changed-to viewing angle to receiving, by the VR device, the VR video stream of the changed-to viewing angle and using the VR video stream for playing need to take a specific time (including a time required for data transmission and decoding). If a VR video stream, buffered by the VR device, of a changed-from viewing angle is played to an end within the foregoing specific time, display interruption occurs on the VR device. Therefore, to avoid display interruption, during viewing angle switching, the server needs to simultaneously send the VR video stream of the changed-from viewing angle and the VR video stream of the changed-to viewing angle to the VR device. In this case, double bandwidth needs to be occupied during viewing angle switching, resulting in the traffic burst.

To resolve the problems of the high latency and occupation of large bandwidth of the network VR service, and also to avoid the problems in the foregoing example, the embodiments of this application provide a video playing method, and a device and a system that are based on the method. In the embodiments of this application, a server sends two service data streams to a VR device. One is a high-resolution VR video stream of a viewing angle, and is used to meet a display requirement in a case of a fixed viewing angle. The other is a low-resolution VR video stream of a full viewing angle, and is used to meet a display requirement during viewing angle switching. Compared with a 360-degree transmission solution, in the embodiments of this application, bandwidth occupation is reduced. In addition, the low-resolution VR video stream of the full viewing angle covers 360 degrees of viewing angles, so that image data required during viewing angle switching does not need to be obtained from the server through requesting, thereby reducing a display latency during viewing angle switching. Compared with the foregoing example, in the embodiments of this application, the server does not need to repeatedly store the low-resolution VR video stream of the full viewing angle, reducing storage overheads; and when determining, based on viewing angle information, that a viewing angle of the VR device changes, the server may stop sending a VR video stream of a first viewing angle to the VR device, and then send a VR video stream of a changed-to second viewing angle, so that the traffic burst does not occur.

The following further describes the embodiments of this application in detail based on commonality in the embodiments of this application.

Figure 3:
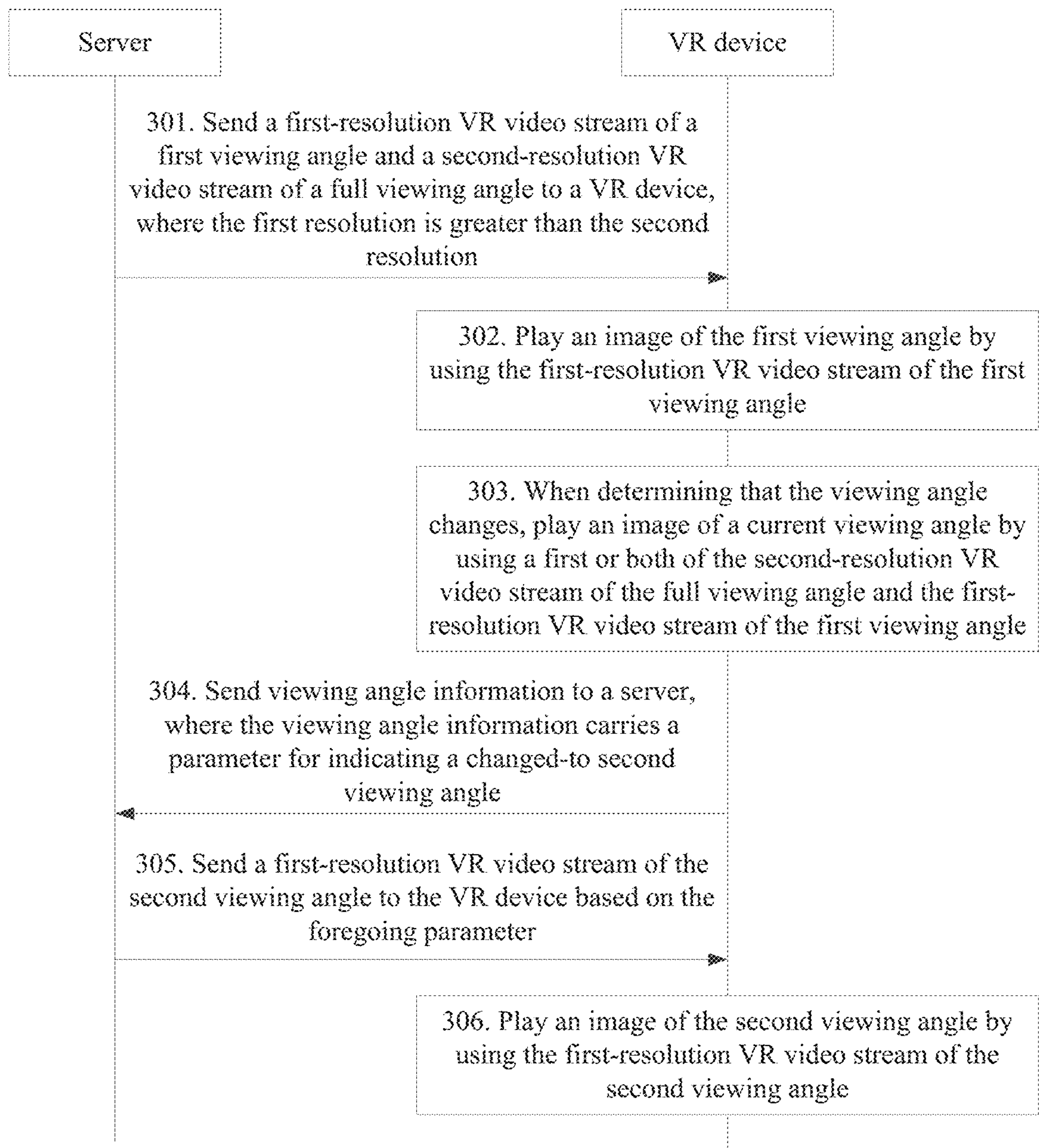
FIG. 3 is a flowchart of a video playing method according to an embodiment of this application.

FIG. 3 is a flowchart of a video playing method according to an embodiment of this application. The method may be applied to the application scenario shown in FIG. 2A or FIG. 2B. The method may include the following steps.

Step 301. A server sends a first-resolution VR video stream of a first viewing angle and a second-resolution VR video stream of a full viewing angle to a VR device, where the first resolution is greater than the second resolution.

In this embodiment of this application, the server sends two service data streams to the VR device. One is a high-resolution VR video stream of a viewing angle (namely, a first-resolution VR video stream of a viewing angle (such as the first viewing angle or a second viewing angle)), and is used to meet a display requirement in a case of a fixed viewing angle. The other is a low-resolution VR video stream of the full viewing angle (namely, the second-resolution VR video stream of the full viewing angle), and is used to meet a display requirement during viewing angle switching. In this embodiment of this application, a resolution determines a definition of a VR video. A higher resolution indicates a higher definition of the VR video, and a lower resolution indicates a lower definition of the VR video.

The server sends the second-resolution VR video stream of the full viewing angle to the VR device regardless of a viewing angle change. In an example, the server continuously sends the VR video stream of the full viewing angle to the VR device in a process of sending the VR video stream of the first viewing angle to the VR device. In another example, the server sends the VR video stream of the full viewing angle to the VR device at preset time intervals. The preset time intervals may be the same or different, and this is not limited in this embodiment of this application.

In an example, the server stores a first-resolution VR video stream of the full viewing angle and the second-resolution VR video stream of the full viewing angle. When detecting that the VR device requests to obtain a VR video stream of a viewing angle, the server extracts the VR video stream of the viewing angle from the first-resolution VR video stream of the full viewing angle. For example, when detecting that the VR device requests to obtain the VR video stream of the first viewing angle, the server extracts the VR video stream of the first viewing angle from the first-resolution VR video stream of the full viewing angle. In this case, the server only needs to store the first-resolution VR video stream of the full viewing angle and the second-resolution VR video stream of the full viewing angle. Storage overheads occupied by the second-resolution VR video stream of the full viewing angle are approximately 0.1 times those occupied by the first-resolution VR video stream of the full viewing angle. Therefore, total storage overheads occupied are approximately 1.1 times those occupied by the first-resolution VR video stream of the full viewing angle. Compared with the foregoing example, in this method, storage overheads of the server are substantially reduced.

In another example, the server stores first-resolution VR video streams of n viewing angles and the second-resolution VR video stream of the full viewing angle, where n is an integer greater than 1. In actual application, a value of n may be obtained based on practical experience, and the n viewing angles combined can cover the full viewing angle. For example, n is 25, 30, or 35. When detecting that the VR device requests to obtain a VR video stream of a viewing angle, the server selects the VR video stream of the viewing angle from the first-resolution VR video streams of the n viewing angles. For example, when detecting that the VR device requests to obtain the VR video stream of the first viewing angle, the server selects the VR video stream of the first viewing angle from the first-resolution VR video streams of the n viewing angles. The first viewing angle is one of the n viewing angles. In this way, the server does not need to repeatedly store the second-resolution VR video stream of the full viewing angle, and only needs to store the second-resolution VR video stream of the full viewing angle once. Compared with the foregoing example, in this method, storage overheads of the server are reduced to some extent. In addition, in this example, after receiving a request from the VR device, the server does not need to extract, from the VR video stream of the full viewing angle, a VR video stream of a viewing angle required by the VR device, and only needs to directly select, from the stored VR video streams of the n viewing angles, the VR video stream of the viewing angle required by the VR device. This helps shorten a latency of a response of the server to the request from the VR device.

In addition, the first-resolution VR video streams of the n viewing angles may be separately extracted by the server from the first-resolution VR video stream of the full viewing angle, or may be n independent video streams, and a VR video stream of each viewing angle is separately collected by one or more cameras.

Optionally, the second-resolution VR video stream of the full viewing angle is converted from the first-resolution VR video stream of the full viewing angle. The foregoing resolution conversion operation may be performed by the server, or may be performed by another device connected to the server (such as a source server configured to provide a VR video resource for the server). Certainly, in other possible implementations, if the first-resolution VR video streams of the n viewing angles are n independent video streams, and a VR video stream of each viewing angle is separately collected by one or more cameras, in one manner, the server may first integrate the first-resolution VR video streams of the n viewing angles, to obtain the first-resolution VR video stream of the full viewing angle, and then convert the first-resolution VR video stream of the full viewing angle to the second-resolution VR video stream of the full viewing angle; or in another manner, the server may convert the first-resolution VR video streams of the n viewing angles to second-resolution VR video streams of the n viewing angles, respectively, and then integrate the second-resolution VR video streams of the n viewing angles, to obtain the second-resolution VR video stream of the full viewing angle.

Optionally, resolution conversion is implemented by changing an image transmission format of a VR video stream. For example, an image transmission format, such as Double Common Intermediate Format (DCIF) or 4× Common Intermediate Format (4CIF), may be used for a first-resolution VR video stream, and an image transmission format, such as Common Intermediate Format (CIF) or Quarter Common Intermediate Format (QCIF), may be used for a second-resolution VR video stream. For example, 4CIF is used for the first-resolution VR video stream of the full viewing angle, and QCIF is used for the second-resolution VR video stream of the full viewing angle; in this case, the first resolution is 704×576, and the second resolution is 176×144.

A VR video stream may be transmitted by using a streaming media protocol. In the streaming media protocol, different identifiers are used to distinguish between a plurality of different media streams. For example, when the streaming media protocol is the Real-time Transport Protocol (RTP), a synchronization source (SSRC) identifier and a contributing source (CSRC) identifier in the RTP are used to distinguish between a plurality of different media streams. For another example, when the streaming media protocol is the Real-Time Messaging Protocol (RTMP), a message stream identifier (message stream ID) is used to distinguish between a plurality of different media streams. For still another example, when the streaming media protocol is the HTTP Live Streaming (HLS) protocol, a uniform resource identifier (URI) is used to distinguish between a plurality of different media streams. Therefore, when the server sends two VR video streams to the VR device, the two VR video streams can be distinguished by using an identifier defined by the streaming media protocol. In addition, depending on stipulations of different streaming media protocols, the identifier for distinguishing between media streams may be carried in each data packet, or may be carried only in a first data packet (namely, a first data packet). In another possible example, because the VR device separately decodes different media streams (in this embodiment of this application, a media stream is a VR video stream), the different media streams can be distinguished from each other.

Correspondingly, the VR device receives the first-resolution VR video stream of the first viewing angle and the second-resolution VR video stream of the full viewing angle that are sent by the server. The VR device stores the first-resolution VR video stream of the first viewing angle to a first video buffer, and stores the second-resolution VR video stream of the full viewing angle to a second video buffer. The first video buffer is used to store a first-resolution VR video stream of a specific viewing angle, and the second video buffer is used to store the second-resolution VR video stream of the full viewing angle. In this embodiment of this application, the VR device separately stores VR video streams at different resolutions by using two video buffers, facilitating quick selection of different VR video streams for playing, and improving switching smoothness.

Step 302. The VR device plays an image of the first viewing angle by using the first-resolution VR video stream of the first viewing angle.

The VR device decodes the first-resolution VR video stream of the first viewing angle, to obtain the image of the first viewing angle, and then plays the image of the first viewing angle. In this embodiment of this application, a codec algorithm for the VR video stream is not limited. For example, the codec algorithm is a codec algorithm provided by the Moving Picture Experts Group (MPEG) standard, a video codec (VC) related algorithm, or an H.264 codec algorithm.

Optionally, when detecting that a data volume of the VR video stream of the first viewing angle buffered in the first video buffer is greater than a preset threshold, the VR device starts to read the VR video stream of the first viewing angle from the first video buffer, and decodes and plays the VR video stream. The preset threshold may be preset based on practical experience.

Step 303. When the VR device determines that the viewing angle changes, the VR device plays an image of a current viewing angle by using the first or both of the second-resolution VR video stream of the full viewing angle and the first-resolution VR video stream of the first viewing angle.

In a VR video playing process, the VR device detects in real time whether the viewing angle changes, that is, detects whether the viewing angle changes from the first viewing angle to another viewing angle. When the VR device determines that the viewing angle changes, the VR device plays the image of the current viewing angle by using the first or both of the second-resolution VR video stream of the full viewing angle and the first-resolution VR video stream of the first viewing angle, and the current viewing angle is a viewing angle determined by the VR device in real time. When the VR device determines that the viewing angle does not change, the VR device continues playing the image of the first viewing angle by using the first-resolution VR video stream of the first viewing angle.

In an example, the VR device plays the image of the current viewing angle by using the second-resolution VR video stream of the full viewing angle. This step may include the following sub-steps:

1. The VR device decodes the second-resolution VR video stream of the full viewing angle, to obtain a full viewing angle image.

2. The VR device extracts the image of the current viewing angle from the full viewing angle image.

3. The VR device plays the image of the current viewing angle.

During the viewing angle change, the VR device reads the second-resolution VR video stream of the full viewing angle from the second video buffer, and plays the image of the current viewing angle by using the second-resolution VR video stream of the full viewing angle. Because the second-resolution VR video stream of the full viewing angle is stored in the local second video buffer, the VR device does not need to request to obtain the VR video stream from the server. Therefore, an MTP latency during viewing angle switching can be reduced, and an MTP latency requirement of less than 20 milliseconds is met. In addition, during the viewing angle change (for example, in a process in which a user turns the head), a low-resolution image is displayed; however, an image sensed by a human eye during movement is blurry, so that displaying the low-resolution image to the user does not degrade visual experience.

In another example, the VR device plays the image of the current viewing angle by using the second-resolution VR video stream of the full viewing angle and the first-resolution VR video stream of the first viewing angle. This step may include the following sub-steps:

1. The VR device decodes the first-resolution VR video stream of the first viewing angle, to obtain the image of the first viewing angle.

2. The VR device decodes the second-resolution VR video stream of the full viewing angle, to obtain a full viewing angle image.

3. The VR device extracts an overlapping image from the image of the first viewing angle, and extracts a non-overlapping image from the full viewing angle image.

4. The VR device combines the overlapping image and the non-overlapping image to obtain the image of the current viewing angle.

5. The VR device plays the image of the current viewing angle.

The overlapping image is an image of an overlapping area between the image of the first viewing angle and the image of the current viewing angle, and the non-overlapping image is an image different from the image of the overlapping area in the image of the current viewing angle. During the viewing angle change, there may still be an overlapping area between the current viewing angle and the first viewing angle. An image of the overlapping area may still be played by using a high resolution, to reduce a definition loss as much as possible.

Figure 4:
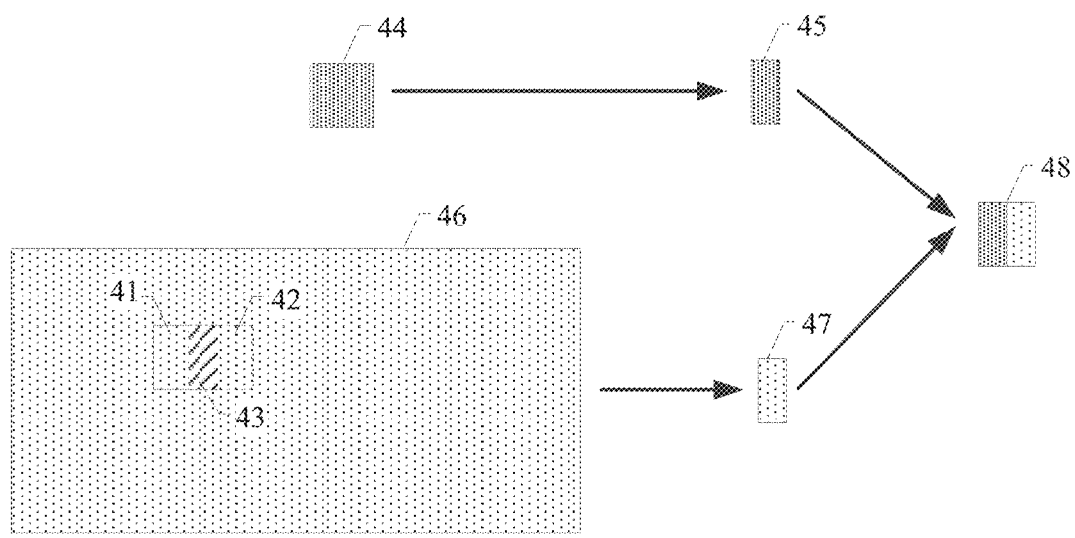
FIG. 4 is a schematic diagram of obtaining an image of a current viewing angle through combination according to an embodiment of this application.

FIG. 4 is a schematic diagram of obtaining an image of a current viewing angle through combination according to this embodiment of this application. An overlapping area 43 (shown by a rectangular box filled with slanted lines in the figure) exists between a first viewing angle 41 (shown by a solid line square box in the figure) and a current viewing angle 42 (shown by a dashed-line square box in the figure). The VR device extracts an overlapping image 45 from a first-resolution image 44 of the first viewing angle, extracts a non-overlapping image 47 from a second-resolution full viewing angle image 46, and combines the overlapping image 45 and the non-overlapping image 47 to obtain an image 48 of the current viewing angle. Optionally, the VR device scales the overlapping image 45 and the non-overlapping image 47 to a same resolution, and combines them to obtain the image 48 of the current viewing angle.

In this embodiment of this application, a sequence for performing sub-step 1 and sub-step 2 in the another example is not limited. Sub-step 1 may be performed before sub-step 2, may be performed after sub-step 2, or may be performed at a same time as sub-step 2.

In addition, in this embodiment of this application, the viewing angle change may mean that the current viewing angle is different from the original viewing angle, or that an amount of change between the current viewing angle and the original viewing angle is less than a preset threshold, and the preset threshold may be preset based on an actual need.

Step 304. The VR device sends viewing angle information to the server, where the viewing angle information carries a parameter for indicating a changed-to second viewing angle.

In an example, the VR device proactively reports the viewing angle information to the server. For example, the VR device sends viewing angle information to the server at a first preset time interval, and viewing angle information reported each time carries a parameter for indicating a current viewing angle (namely, a viewing angle at a reporting moment). The first preset time interval may be preset based on an actual need. For another example, the VR device sends viewing angle information to the server when detecting that the viewing angle changes, and the viewing angle information carries the parameter for indicating the changed-to second viewing angle; and the VR device does not send viewing angle information to the server when detecting that the viewing angle does not change.

In another example, the VR device sends viewing angle information to the server after receiving a polling request sent by the server. For example, the server sends a polling request to the VR device at a second preset time interval, and the VR device sends viewing angle information to the server after receiving the polling request. Viewing angle information reported each time carries a parameter for indicating a current viewing angle (namely, a viewing angle at a reporting moment). The second preset time interval may be preset based on an actual need.

Correspondingly, the server receives the viewing angle information sent by the VR device. The manner provided in this embodiment of this application can ensure that the server learns of a viewing angle change of the VR device in a timely manner.

Step 305. The server sends a first-resolution VR video stream of the second viewing angle to the VR device based on the foregoing parameter.

The server obtains the first-resolution VR video stream of the second viewing angle based on the parameter, carried in the viewing angle information, for indicating the changed-to second viewing angle, and then sends the first-resolution VR video stream of the second viewing angle to the VR device.

In an example, if the server stores the first-resolution VR video stream of the full viewing angle, the server extracts the VR video stream of the second viewing angle from the first-resolution VR video stream of the full viewing angle.

In another example, if the server stores the first-resolution VR video streams of the n viewing angles, the server selects the VR video stream of the second viewing angle from the first-resolution VR video streams of the n viewing angles.

Correspondingly, the VR device receives the first-resolution VR video stream of the second viewing angle sent by the server. The VR device stores the first-resolution VR video stream of the second viewing angle to the first video buffer.

In this embodiment of this application, when determining, based on the viewing angle information, that the viewing angle of the VR device changes, the server may stop sending the VR video stream of the first viewing angle to the VR device, and then send the VR video stream of the changed-to second viewing angle, so that a traffic burst does not occur. In addition, the low-resolution VR video stream of the full viewing angle is separately sent; therefore, before the VR video stream of the second viewing angle arrives at the VR device, the VR device may play the image of the current viewing angle by using the low-resolution VR video stream of the full viewing angle, and display interruption does not occur.

Step 306. The VR device plays an image of the second viewing angle by using the first-resolution VR video stream of the second viewing angle.

The VR device decodes the first-resolution VR video stream of the second viewing angle, to obtain the image of the second viewing angle, and then plays the image of the second viewing angle.

Optionally, when the VR device does not need to use the first-resolution VR video stream of the first viewing angle buffered in the first video buffer, the VR device performs data aging on the VR video stream of the first viewing angle buffered in the first video buffer. Data aging indicates removing buffered data, and performing data aging on the VR video stream of the first viewing angle is to remove the VR video stream of the first viewing angle from the first video buffer. In this way, buffering resources in the first video buffer can be released as soon as possible.

When the VR device determines that the viewing angle changes, if the VR device plays the image of the current viewing angle by using the second-resolution VR video stream of the full viewing angle, when the VR device determines that the viewing angle changes, the VR device may perform data aging on the first-resolution VR video stream of the first viewing angle buffered in the first video buffer. When the VR device determines that the viewing angle changes, if the VR device plays the image of the current viewing angle by using the first or both of the second-resolution VR video stream of the full viewing angle and the first-resolution VR video stream of the first viewing angle, when the VR device plays the image of the second viewing angle by using the first-resolution VR video stream of the second viewing angle, data aging may be performed on the first-resolution VR video stream of the first viewing angle buffered in the first video buffer.

According to the solution provided in this embodiment of this application, the server sends two service data streams to the VR device. One is a high-resolution VR video stream of a viewing angle, and is used to meet a display requirement in a case of a fixed viewing angle. The other is a low-resolution VR video stream of the full viewing angle, and is used to meet a display requirement during viewing angle switching. Compared with a 360-degree transmission solution, in this solution, bandwidth occupation is reduced. In addition, the low-resolution VR video stream of the full viewing angle covers 360 degrees of viewing angles, so that image data required during viewing angle switching does not need to be obtained from the server through requesting, thereby reducing a display latency during viewing angle switching. Compared with the foregoing example, in this solution, the server does not need to repeatedly store the low-resolution VR video stream of the full viewing angle, reducing the storage overheads; and when determining, based on the viewing angle information, that the viewing angle of the VR device changes, the server may stop sending the VR video stream of the first viewing angle to the VR device, and then send the VR video stream of the changed-to second viewing angle, so that the traffic burst does not occur.

Figure 5A:
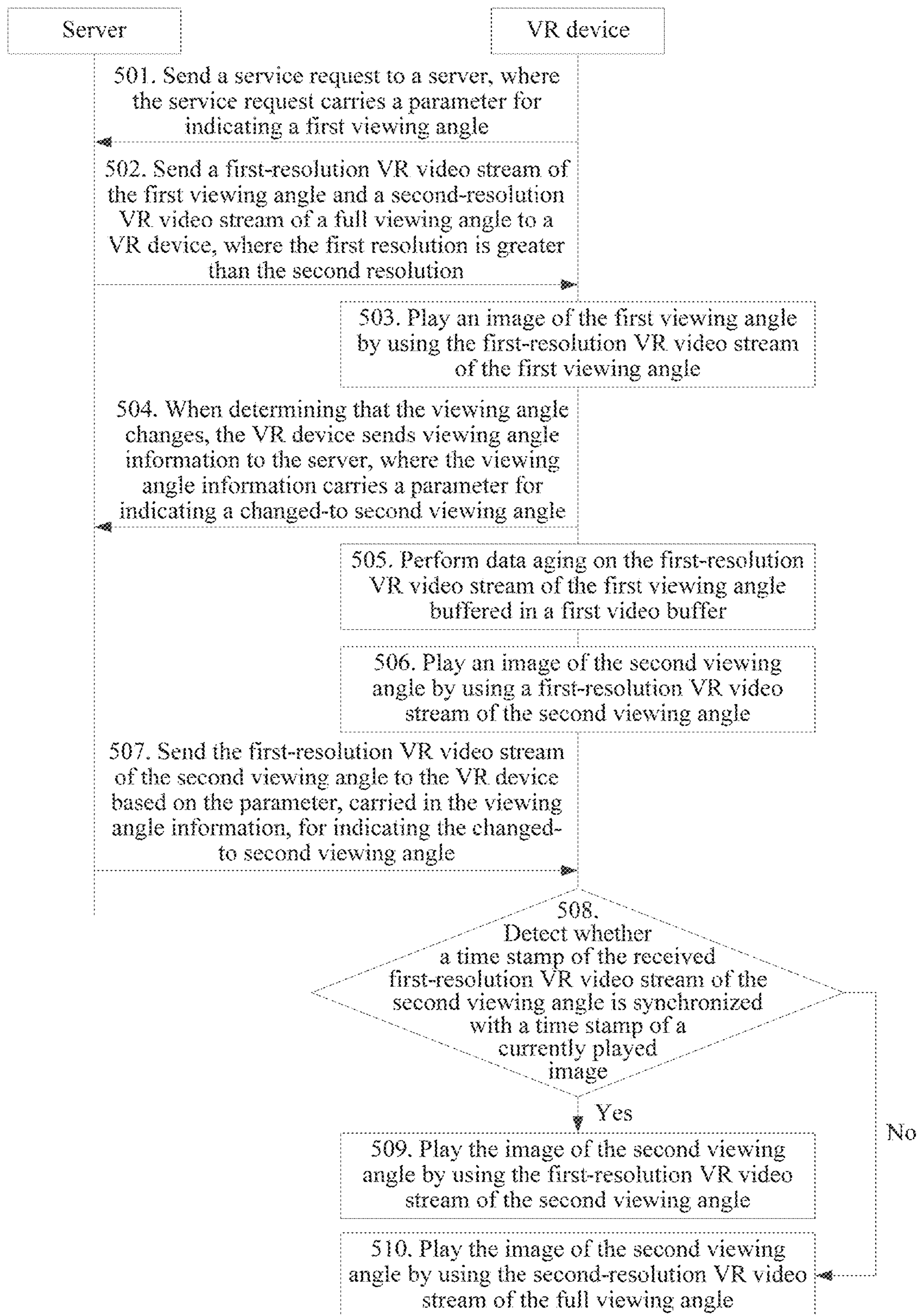
FIG. 5A is a flowchart of a video playing method according to another embodiment of this application.
Figure 5B:
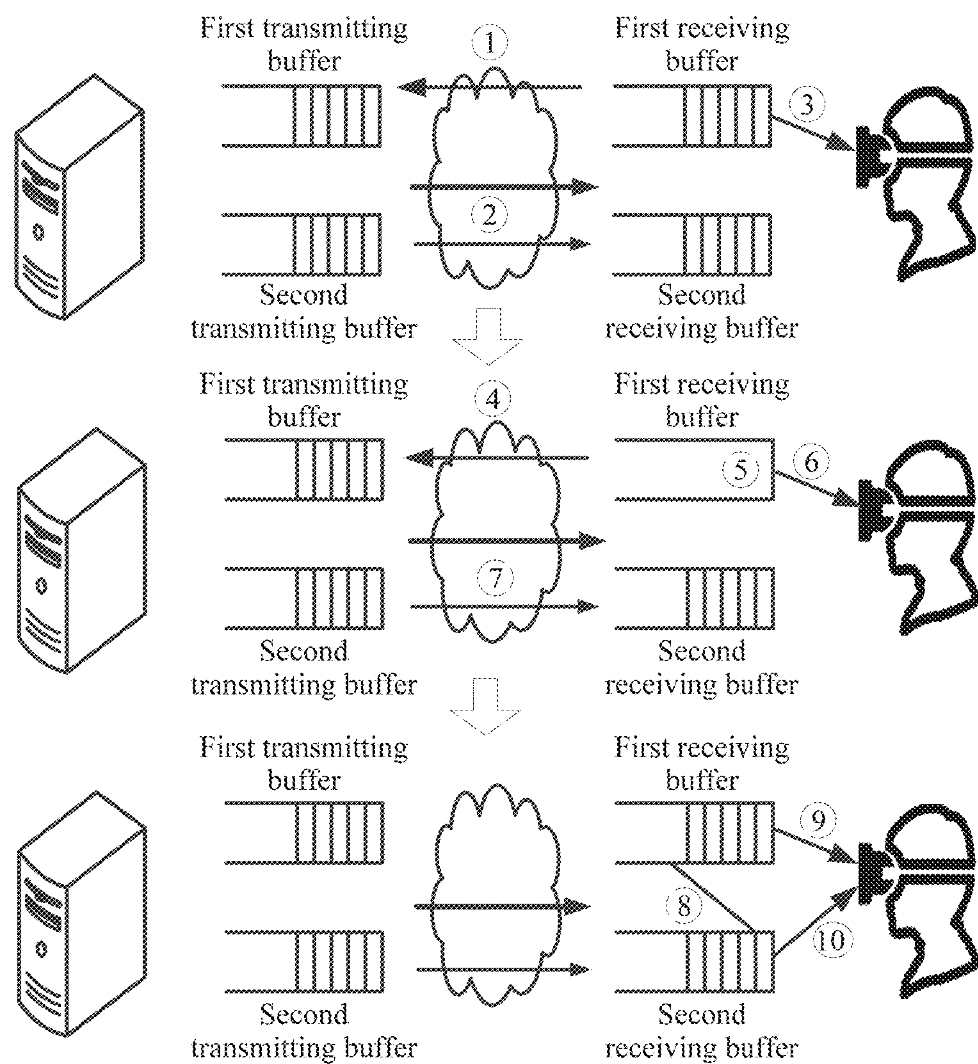
FIG. 5B is a schematic interaction diagram corresponding to the embodiment of FIG. 5A.

FIG. 5A and FIG. 5B are flowcharts of a video playing method according to another embodiment of this application. The method may be applied to the application scenario shown in FIG. 2A or FIG. 2B. The method may include the following steps.

In FIG. 5B, steps 1 to 10 represented by circles are corresponding to the following steps 501 to 510, respectively.

Step 501. A VR device sends a service request to a server, where the service request carries a parameter for indicating a first viewing angle.

The service request is used to request to obtain a VR video resource from the server.

Correspondingly, the server receives the service request sent by the VR device.

Step 502. The server sends a first-resolution VR video stream of the first viewing angle and a second-resolution VR video stream of a full viewing angle to the VR device, where the first resolution is greater than the second resolution.

After receiving the service request, the server obtains the first-resolution VR video stream of the first viewing angle based on the parameter, carried in the service request, for indicating the first viewing angle, and sends the VR video stream to the VR device. In addition, the server further sends the second-resolution VR video stream of the full viewing angle to the VR device, until the VR device stops requesting to obtain the VR video resource from the server, or in other words, until a service stops. In addition, the second-resolution VR video stream may be obtained through video transcoding on the first-resolution VR video stream. For example, the second resolution is 10% of the first resolution.

Correspondingly, the VR device receives the first-resolution VR video stream of the first viewing angle and the second-resolution VR video stream of the full viewing angle that are sent by the server.

With reference to FIG. 5B, two channels of transmitting buffers are set in the server, including a first transmitting buffer and a second transmitting buffer. The first transmitting buffer is used to send a first-resolution VR video stream of a viewing angle (which may also be referred to as an FOV video stream) to the VR device, and the second transmitting buffer is used to send the second-resolution VR video stream of the full viewing angle (which may also be referred to as a 360-degree video stream) to the VR device. Correspondingly, two channels of receiving buffers are set in the VR device, including a first receiving buffer and a second receiving buffer. The first receiving buffer, namely, the first video buffer described in the embodiment of FIG. 3, is used to store the received first-resolution VR video stream of the viewing angle (which may also be referred to as the FOV video stream), and the second receiving buffer, namely, the second video buffer described in the embodiment of FIG. 3, is used to store the received second-resolution VR video stream of the full viewing angle (which may also be referred to as the 360-degree video stream).

Step 503. The VR device plays an image of the first viewing angle by using the first-resolution VR video stream of the first viewing angle.

After buffered video data of the VR video stream in the first video buffer reaches a specific time length (for example, 1 second), the VR device reads the first-resolution VR video stream of the first viewing angle from the first video buffer, and decodes and plays the VR video stream.

Step 504. When the VR device determines that the viewing angle changes, the VR device sends viewing angle information to the server, where the viewing angle information carries a parameter for indicating a changed-to second viewing angle.

Optionally, the VR device sends a viewing angle switching request to the server. The viewing angle switching request carries the parameter for indicating the changed-to second viewing angle, and the viewing angle switching request is used to request to obtain a VR video stream of the changed-to second viewing angle.

Correspondingly, the server receives the viewing angle information sent by the VR device.

Step 505. The VR device performs data aging on the first-resolution VR video stream of the first viewing angle buffered in a first video buffer.

For example, the VR device removes the data stored in the first video buffer, and prepares to receive a first-resolution VR video stream of the second viewing angle.

Step 506. The VR device plays an image of a current viewing angle by using the second-resolution VR video stream of the full viewing angle.

The VR device reads the second-resolution VR video stream of the full viewing angle from the second video buffer, decodes the VR video stream to obtain a full viewing angle image, and extracts the image of the current viewing angle from the full viewing angle image for playing.

It should be noted that, in this embodiment of this application, a sequence for performing steps 504, 505, and 506 is not limited. The foregoing three steps may be performed sequentially or simultaneously.

Step 507. The server sends a first-resolution VR video stream of the second viewing angle to the VR device based on the parameter, carried in the viewing angle information, for indicating the changed-to second viewing angle.

When determining, based on the viewing angle information, that the viewing angle of the VR device changes, the server may stop sending the VR video stream of the first viewing angle to the VR device, and then send the VR video stream of the changed-to second viewing angle. Correspondingly, the VR device receives the first-resolution VR video stream of the second viewing angle sent by the server.

In addition, when determining that the viewing angle of the VR device changes, the server may remove data from the first transmitting buffer, and prepares to send the first-resolution VR video stream of the second viewing angle.

Step 508. The VR device detects whether a time stamp of the received first-resolution VR video stream of the second viewing angle is synchronized with a time stamp of the currently played image; and if the time stamp of the received first-resolution VR video stream of the second viewing angle is synchronized with the time stamp of the currently played image, performs step 509; or if the time stamp of the received first-resolution VR video stream of the second viewing angle is not synchronized with the time stamp of the currently played image, performs step 510.

After receiving the first-resolution VR video stream of the second viewing angle, the VR device compares the time stamp of the VR video stream with the time stamp of the currently played image, to determine whether the time stamps are synchronized. Optionally, "synchronized" means that the time stamp of the received first-resolution VR video stream of the second viewing angle includes the time stamp of the currently played image. That is, if the time stamp of the received first-resolution VR video stream of the second viewing angle includes the time stamp of the currently played image, it indicates that the received first-resolution VR video stream of the second viewing angle has not expired. If the time stamp of the received first-resolution VR video stream of the second viewing angle does not include the time stamp of the currently played image, it indicates that the received first-resolution VR video stream of the second viewing angle may have expired, and the VR device may discard the expired VR video stream.

Step 509. The VR device plays an image of the second viewing angle by using the first-resolution VR video stream of the second viewing angle.

If the time stamps are synchronized, the VR device plays the image of the second viewing angle by using the first-resolution VR video stream of the second viewing angle.

Step 510. The VR device plays an image of the second viewing angle by using the second-resolution VR video stream of the full viewing angle.

If the time stamps are not synchronized, the VR device still plays the image of the second viewing angle by using the second-resolution VR video stream of the full viewing angle, and plays the image of the second viewing angle by using the first-resolution VR video stream of the second viewing angle when the time stamps become synchronized.

Optionally, if the time stamps are not synchronized, the VR device sends a synchronization request to the server, and the synchronization request is used to request the server to feed back a VR video stream whose time stamp is synchronized with the time stamp of the currently played image. After receiving the synchronization request sent by the VR device, the server sends the first-resolution VR video stream of the second viewing angle that the VR needs after a period of time. For example, the server may obtain a new time stamp by moving the time stamp of the originally sent VR video stream of the second viewing angle backwards for a period of time, and starts to send the first-resolution VR video stream of the second viewing angle from the new time stamp. For another example, the synchronization request sent by the VR device to the server may carry the time stamp of the currently played image, and the server may obtain a new time stamp through prediction based on the time stamp of the currently played image and a time required for data transmission and encoding and decoding, and starts to send the first-resolution VR video stream of the second viewing angle from the new time stamp. Certainly, in another possible implementation, when sending the first-resolution VR video stream of the second viewing angle to the VR device in step 507, the server may start to send the first-resolution VR video stream of the second viewing angle to the VR device based on a time stamp of the currently sent second-resolution VR video stream of the full viewing angle, that is, from the time stamp or from a new time stamp obtained after moving the time stamp backwards for a period of time. This can accelerate a time stamp synchronization process, and prevent visual experience of a user from being affected because the time stamps are not synchronized for a long time and consequently the VR device plays the second-resolution image for a long time.

In addition, in a process in which the user is watching a VR video, the viewing angle of the user may always be changing, and consequently, viewing angle information fed back by the VR device to the server cannot keep up with an actual viewing angle. Therefore, a corresponding viewing angle prediction mechanism may be further set on a server side. The viewing angle prediction mechanism is used to predict an actual viewing angle based on viewing angle information fed back by the VR device, and then feed back, to the VR device, video data of the viewing angle required by the VR device, to implement viewing angle synchronization.

According to the solution provided in this embodiment of this application, the VR device further detects whether the time stamp of the received first-resolution VR video stream of the second viewing angle is synchronized with the time stamp of the currently played image, to ensure smooth and accurate VR video playing for the user.

In the foregoing method embodiments, the technical solutions provided in this application are merely described from a perspective of interaction between the VR device and the server. The steps on the VR device side may be separately implemented as a video playing method on the VR device side, and the steps on the server side may be separately implemented as a video playing method on the server side.

It can be understood that, to implement the foregoing functions, the device (for example, the VR device or the server) includes corresponding hardware structures and/or software modules (or units) for performing the functions. Units and algorithm steps in examples described with reference to the embodiments disclosed in this application can be implemented by hardware or a combination of hardware and computer software in the embodiments of this application. Whether a function is performed by hardware or computer software driving hardware depends on particular applications and design constraints of the technical solutions. For each particular application, a person skilled in the art may use different methods to implement a described function, but it should not be considered that the implementation goes beyond the scope of the technical solutions of the embodiments of this application.

In the embodiments of this application, the device (for example, the VR device or the server) may be divided into functional units based on the foregoing method examples. For example, each functional unit may be corresponding to one function, or two or more functions may be integrated into one processing unit. The integrated unit may be implemented in a form of hardware, or may be implemented in a form of a software functional unit. It should be noted that the unit division in the embodiments of this application is an example, is merely logical function division, and may be other division in actual implementation.

Figure 6A:
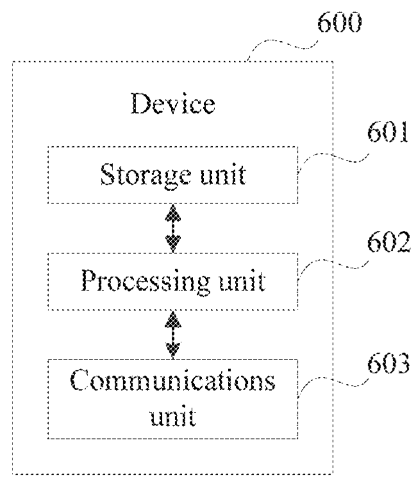
FIG. 6A is a schematic block diagram of a device according to an embodiment of this application.

When the integrated unit is used, FIG. 6A is a possible schematic structural diagram of the device in the foregoing embodiments. A device 600 includes a processing unit 602 and a communications unit 603. The processing unit 602 is configured to control and manage an action of the device 600. For example, when the device 600 is a VR device, the processing unit 602 is configured to support the device 600 in performing steps 302 to 304 and step 306 in FIG. 3, step 501, steps 503 to 506, and steps 508 to 510 in FIG. 5A, and/or another step for implementing the technology described in this specification. When the device 600 is a server, the processing unit 602 is configured to support the device 600 in performing steps 301 and 305 in FIG. 3, steps 502 and 507 in FIG. 5A, and/or another step for implementing the technology described in this specification. The communications unit 603 is configured to support communication between the device 600 and another device. The device 600 may further include a storage unit 601, and the storage unit 601 is configured to store program code and data of the device 600.

The processing unit 602 may be a processor or a controller, for example, a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The controller/processor may implement or execute various example logical blocks, modules, and circuits described with reference to content disclosed in this application. Alternatively, the processor may be a combination implementing a computing function, for example, a combination including one or more microprocessors, or a combination of a DSP and a microprocessor. The communications unit 603 may be a communications interface, a transceiver, a transceiver circuit, or the like. The communications interface is a collective term and may include one or more interfaces, for example, an interface between the server and the VR device. The storage unit 601 may be a memory.

Figure 6B:
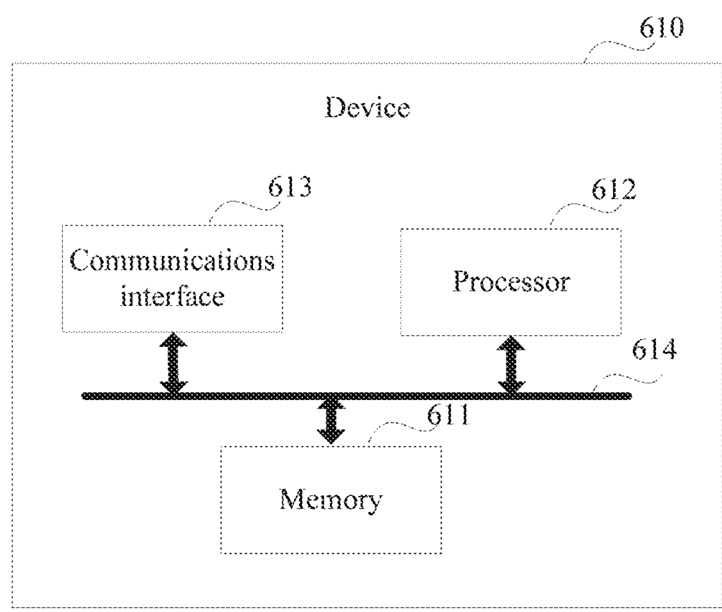
FIG. 6B is a schematic structural diagram of a device according to an embodiment of this application.

When the processing unit 602 is a processor, the communications unit 603 is a communications interface, and the storage unit 601 is a memory, the device in this embodiment of this application may be a device shown in FIG. 6B.

Referring to FIG. 6B, the device 610 includes a processor 612, a communications interface 613, and a memory 611. Optionally, the device 610 may further include a bus 614. The communications interface 613, the processor 612, and the memory 611 may be connected to each other by using the bus 614. The bus 614 may be a Peripheral Component Interconnect (PCI for short) bus, an extended industry standard architecture (EISA for short) bus, or the like. The bus 614 may be classified into an address bus, a data bus, a control bus, and the like. For ease of representation, only one thick line is used to represent the bus in FIG. 6B, but this does not mean that there is only one bus or only one type of bus.

The device shown in FIG. 6A or FIG. 6B may be a server or a VR device.

Methods or algorithm steps described with reference to the content disclosed in the embodiments of this application may be implemented by hardware, or may be implemented by a processor by executing a software instruction. The software instruction may include a corresponding software module (or unit). The software module (or unit) may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, an example storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in the device. Certainly, the processor and the storage medium may alternatively exist in the device as discrete components.

A person skilled in the art should be aware that in the foregoing one or more examples, functions described in the embodiments of this application may be implemented by hardware, software, firmware, or any combination thereof. The embodiments of this application further provide a computer program product. When the computer program product is executed, the computer program product is configured to implement the foregoing functions. In addition, the computer program may be stored in a computer readable medium or transmitted as one or more instructions or code on the computer readable medium. The computer readable medium includes a computer storage medium and a communications medium, and the communications medium includes any medium that enables a computer program to be transmitted from one place to another. The storage medium may be any available medium accessible to a general-purpose or dedicated computer.

In the foregoing specific implementations, the objectives, technical solutions, and beneficial effects of the embodiments of this application are further described in detail. It should be understood that the foregoing descriptions are merely specific implementations of the embodiments of this application, but are not intended to limit the protection scope of the embodiments of this application. Any modification, equivalent replacement, or improvement made based on the technical solutions of the embodiments of this application shall fall within the protection scope of the embodiments of this application.

What is claimed is:

1. A method, comprising:

receiving, by a virtual reality (VR) device, a first-resolution VR video stream of a first viewing angle and a second-resolution VR video stream of a full viewing angle that are sent by a server, wherein the first resolution is greater than the second resolution;

playing, by the VR device, an image of the first viewing angle using the first-resolution VR video stream of the first viewing angle;

in response to the VR device determining that a current viewing angle has changed, playing, by the VR device, an image of the current viewing angle using the second-resolution VR video stream of the full viewing angle;

sending, by the VR device, viewing angle information to the server, wherein the viewing angle information carries a parameter for indicating a changed-to second viewing angle;

receiving, by the VR device, a first-resolution VR video stream of the second viewing angle sent by the server;

detecting, by the VR device, whether a time stamp of the received first-resolution VR video stream of the second viewing angle comprises a time stamp of a currently played image;

in response to detecting that the time stamp of the received first-resolution VR video stream of the second viewing angle is synchronized with the time stamp of the currently played image, playing, by the VR device, an image of the second viewing angle using the first-resolution VR video stream of the second viewing angle; and in response to detecting that the time stamp of the received first-resolution VR video stream of the second viewing angle does not comprise the time stamp of the currently played image, playing, by the VR device, the image of the second viewing angle using the second-resolution VR video stream of the full viewing angle.

2. The method according to claim 1, wherein playing, by the VR device, the image of the current viewing angle using the second-resolution VR video stream of the full viewing angle comprises:

decoding, by the VR device, the second-resolution VR video stream of the full viewing angle, to obtain a full viewing angle image;

extracting, by the VR device, the image of the current viewing angle from the full viewing angle image; and playing, by the VR device, the image of the current viewing angle.

3. The method according to claim 1, wherein playing, by the VR device, the image of the current viewing angle using the second-resolution VR video stream of the full viewing angle comprises:

decoding, by the VR device, the first-resolution VR video stream of the first viewing angle, to obtain the image of the first viewing angle;

decoding, by the VR device, the second-resolution VR video stream of the full viewing angle, to obtain a full viewing angle image;

extracting, by the VR device, an overlapping image from the image of the first viewing angle, and extracting a non-overlapping image from the full viewing angle image, wherein the overlapping image is an image of an overlapping area between the image of the first viewing angle and the image of the current viewing angle, and the non-overlapping image is an image different from the image of the overlapping area in the image of the current viewing angle;

combining, by the VR device, the overlapping image and the non-overlapping image to obtain the image of the current viewing angle; and playing, by the VR device, the image of the current viewing angle.

4. A method, comprising:

receiving, by a virtual reality (VR) device, a first-resolution VR video stream of a first viewing angle and a second-resolution VR video stream of a full viewing angle that are sent by a server, wherein the first resolution is greater than the second resolution;

after receiving, by the VR device, the first-resolution VR video stream of the first viewing angle and the second-resolution VR video stream of the full viewing angle that are sent by the server, storing, by the VR device, the first-resolution VR video stream of the first viewing angle to a first video buffer, and storing the second-resolution VR video stream of the full viewing angle to a second video buffer;

playing, by the VR device, an image of the first viewing angle using the first-resolution VR video stream of the first viewing angle;

in response to the VR device determining that a current viewing angle has changed, playing, by the VR device, an image of the current viewing angle using the second-resolution VR video stream of the full viewing angle;

sending, by the VR device, viewing angle information to the server, wherein the viewing angle information carries a parameter for indicating a changed-to second viewing angle;

receiving, by the VR device, a first-resolution VR video stream of the second viewing angle sent by the server;

playing, by the VR device, an image of the second viewing angle using the first-resolution VR video stream of the second viewing angle; and in response to the VR device determining that the current viewing angle has changed, or in response to the VR device playing the image of the second viewing angle by using the first-resolution VR video stream of the second viewing angle, performing, by the VR device, data aging on the first-resolution VR video stream of the first viewing angle buffered in the first video buffer.

5. A virtual reality (VR) device, comprising:

a transmitter;

a receiver;

a processor; and a non-transitory memory, the non-transitory memory storing a plurality of processor-executable instructions, wherein the processor executes the plurality of processor executable instructions to:

receive, using the receiver, a first-resolution VR video stream of a first viewing angle and a second-resolution VR video stream of a full viewing angle that are sent by a server, wherein the first resolution is greater than the second resolution;

play an image of the first viewing angle by using the first-resolution VR video stream of the first viewing angle;

in response to the VR device determining that a current viewing angle has changed, play an image of the current viewing angle by using the first-resolution VR video stream of the first viewing angle, or both of the second-resolution VR video stream of the full viewing angle and the first-resolution VR video stream of the first viewing angle;

send, using the transmitter, viewing angle information to the server, wherein the viewing angle information carries a parameter for indicating a changed-to second viewing angle;

receive, using the receiver, a first-resolution VR video stream of the second viewing angle sent by the server;

detect whether a time stamp of the received first-resolution VR video stream of the second viewing angle comprises a time stamp of a currently played image;

in response to detecting the time stamp of the received first-resolution VR video stream of the second viewing angle comprises the time stamp of the currently played image, play an image of the second viewing angle by using the first-resolution VR video stream of the second viewing angle;

in response to detecting the time stamp of the received first-resolution VR video stream of the second viewing angle does not comprise the time stamp of the currently played image, play the image of the second viewing angle using the second-resolution VR video stream of the full viewing angle or the first-resolution VR video stream of the first viewing angle.

6. The VR device according to claim 5, wherein the processor executes the plurality of processor executable instructions to:

decode the second-resolution VR video stream of the full viewing angle, to obtain a full viewing angle image;

extract the image of the current viewing angle from the full viewing angle image; and play the image of the current viewing angle.

7. The VR device according to claim 5, wherein the processor executes the plurality of processor executable instructions further to:

decode the first-resolution VR video stream of the first viewing angle, to obtain the image of the first viewing angle;

decode the second-resolution VR video stream of the full viewing angle, to obtain a full viewing angle image;

extract an overlapping image from the image of the first viewing angle, and extract a non-overlapping image from the full viewing angle image, wherein the overlapping image is an image of an overlapping area between the image of the first viewing angle and the image of the current viewing angle, and the non-overlapping image is an image different from the image of the overlapping area in the image of the current viewing angle;

combine the overlapping image and the non-overlapping image to obtain the image of the current viewing angle; and play the image of the current viewing angle.

8. A virtual reality (VR) device, comprising:

a transmitter;

a receiver;

a processor; and a non-transitory memory, the non-transitory memory storing a plurality of processor-executable instructions, wherein the processor executes the plurality of processor executable instructions to:

receive, using the receiver, a first-resolution VR video stream of a first viewing angle and a second-resolution VR video stream of a full viewing angle that are sent by a server, wherein the first resolution is greater than the second resolution;

store the first-resolution VR video stream of the first viewing angle to a first video buffer, and store the second-resolution VR video stream of the full viewing angle to a second video buffer;

play an image of the first viewing angle using the first-resolution VR video stream of the first viewing angle;

in response to the VR device determining that a current viewing angle has changed, play an image of the current viewing angle using the first-resolution VR video stream of the first viewing angle, or both of the second-resolution VR video stream of the full viewing angle and the first-resolution VR video stream of the first viewing angle;

send, using the transmitter, viewing angle information to the server, wherein the viewing angle information carries a parameter for indicating a changed-to second viewing angle;

receive, using the receiver, a first-resolution VR video stream of the second viewing angle sent by the server;

play an image of the second viewing angle by using the first-resolution VR video stream of the second viewing angle;

in response to the current viewing angle has changed, or in response to the image of the second viewing angle being played using the first-resolution VR video stream of the second viewing angle, perform data aging on the first-resolution VR video stream of the first viewing angle buffered in the first video buffer.

* * * * *